United States Patent [19]

Joseph et al.

[11] Patent Number: 5,387,016
[45] Date of Patent: Feb. 7, 1995

[54] TUBULAR COUPLING

[75] Inventors: Thomas J. Joseph, Commerce; Brett W. Kalem, Dearborn Heights; David C. Letteer, Brighton; Timothy J. Udell, Royal Oak; Glen W. Ostahowski, Canton, all of Mich.; Claudia M. Anderson, Richmond, Ind.

[73] Assignee: Ford Motor Company, Dearborn, Mich.

[21] Appl. No.: 219,563

[22] Filed: Mar. 29, 1994

[51] Int. Cl.6 ............................................. F16L 55/00
[52] U.S. Cl. .................... 285/174; 285/256; 285/318; 285/382; 285/422
[58] Field of Search ............... 285/256, 318, 174, 422, 285/382

[56] References Cited

U.S. PATENT DOCUMENTS

| | | | |
|---|---|---|---|
| 1,296,016 | 3/1919 | Smith | 285/382.2 X |
| 2,453,997 | 11/1948 | MacWilliam | |
| 2,821,415 | 1/1958 | Race | 285/382.2 X |
| 3,220,753 | 11/1965 | Kasidas | 285/256 |
| 3,549,180 | 12/1970 | MacWilliam | 285/256 |
| 3,924,883 | 12/1975 | Frank | 285/256 |
| 4,055,359 | 10/1977 | McWethy | |
| 4,369,992 | 1/1983 | Fournier et al. | |
| 4,401,326 | 8/1983 | Blair | |
| 4,522,435 | 6/1985 | Miller et al. | |
| 4,632,434 | 12/1986 | Proctor | 285/318 X |
| 4,657,285 | 4/1987 | Akiyama et al. | |
| 4,690,435 | 9/1987 | Manning et al. | |
| 4,750,762 | 6/1988 | Corzine | 285/318 X |
| 5,096,231 | 3/1992 | Chisnell et al. | |

FOREIGN PATENT DOCUMENTS

| | | | |
|---|---|---|---|
| 0447622 | 9/1991 | European Pat. Off. | |
| 4088285 | 3/1992 | Japan | 285/256 |
| 4088286 | 3/1992 | Japan | 285/256 |

OTHER PUBLICATIONS

S&H Fabricating and Engineering, Inc.'s Drawings.

Primary Examiner—Dave W. Arola
Attorney, Agent, or Firm—Raymond L. Coppiellie; Roger L. May

[57] ABSTRACT

A connector for joining together a pair of fluid carrying hose members in an automotive vehicle is disclosed. The connector includes a tubular body having a first end, a second end, and a shoulder interposed therebetween, the first end including a plurality of angled barbs projecting from an outer surface thereof. The connector also includes a tubular liner press-fit into the first end of the body and a generally cylindrical, cup-shaped collar surrounding the outer surface of the first end of the body. A roll formed beadlock is formed against an interior surface of the collar to prevent axial displacement of the collar along the body of the connector. A method for making such a connector is also disclosed.

5 Claims, 2 Drawing Sheets

TUBULAR COUPLING

BACKGROUND OF THE INVENTION

1. Field Of The Invention

The present invention relates generally to hose fitting assemblies. More particularly, the present invention relates to a tubular coupling designed for use in high pressure fluid conducting systems such as automotive air conditioning systems.

2. Disclosure Information

Numerous types of tubular couplings have been described in the prior art. For example, U.S. Pat. Nos. 4,055,359 and 4,401,326, assigned to the assignee of the present invention, disclose a quick-connect tubular coupling which permits a fluid-type connection to be made between two fluid-conducting tubes in a relatively short time. Typically, these couplings join together tubing made from steel or other metal alloys. However, in order to reduce weight and packaging requirements within the vehicle, the metal tubing is being replaced by flexible polymeric material and the couplings described in these two patents may not be suitable in these applications.

U.S. Pat. No. 5,096,231 discloses a flexible fluid conduit assembly which utilizes a resilient sealing lining member provided on an outer periphery of a coupling and which sealingly engages a hose member in the fitting to prevent loss therefrom of pressurized fluid such as refrigerant gas. The coupling described in the '231 patent includes a generally cylindrical collar crimped over the lining to hold the flexible hose onto the coupling member. However, because of the force needed to crimp the outer sleeve to the tube, it is necessary to manufacture the coupling out of a heavier gauge material, such as a steel alloy to prevent damage to the coupling.

However, it would be advantageous to provide a tube coupling which can be fabricated from a lightweight aluminum material which ensures that the fitting will not be deformed under the crimping force necessary to secure the flexible hosing to the coupling.

SUMMARY OF THE INVENTION

The present invention solves the problems associated with the prior art by providing a connector for joining together a pair of fluid carrying hose members in an automotive vehicle, comprising a generally tubular body having a first end, a second end and a shoulder interposed therebetween. The first end includes a plurality of angled barbs projecting from an outer surface thereof which are inserted into one of the hose members. The connector includes a generally tubular lining, having a predetermined length and which is press-fit into the first end of the body. The connector further includes a generally cylindrical, cup-shaped collar surrounding the outer surface of the first end of the body, the collar having an open end and a terminating end, the terminating end abutting the shoulder of the body. The connector further comprises means for resisting axial displacement of the collar on the body, the means comprising a roll formed bead against an interior surface of the collar's terminating end.

The connector may also include a tubular coupling formed in the second end thereof to provide a quick-connect feature to a fluid carrying hose member.

There is also disclosed herein a method for making a connector for joining together a pair of hose members for an air conditioning system of an automotive vehicle. The method comprises the steps of:

forming a generally tubular body having a first end, a radially outwardly flared second end, and a shoulder interposed therebetween;

forming a plurality of outwardly projecting barbs on an outer surface of the first end of the body;

inserting a generally tubular liner into the first end of the body and sliding a generally cylindrical, cup-shaped collar having a terminating end and an open end over the first end of the body so that the terminating end abuts the shoulder and the open end surrounds the first end of the body. The method further includes forming a beadlock on the outer surface of the first body end against an interior surface of the terminating end of the collar to prevent axial displacement of the collar relative to the body.

An advantage of the present invention is that the tubular body may be formed from a light-weight aluminum alloy to reduce cost and complexity of the coupling. Furthermore, by providing a tube coupling at one end of the connector, the overall length of the hose assembly can be reduced, allowing for increased packaging variability within the automotive vehicle.

DETAILED DESCRIPTION OF THE PREFERRED EMBODIMENTS

Figure 1:
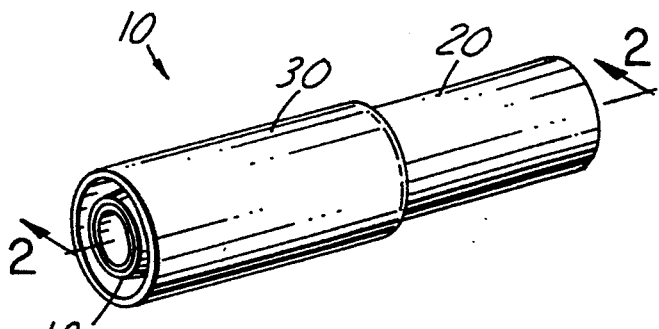
FIG. 1 is a perspective view of the connector according to the present invention.
Figure 2:
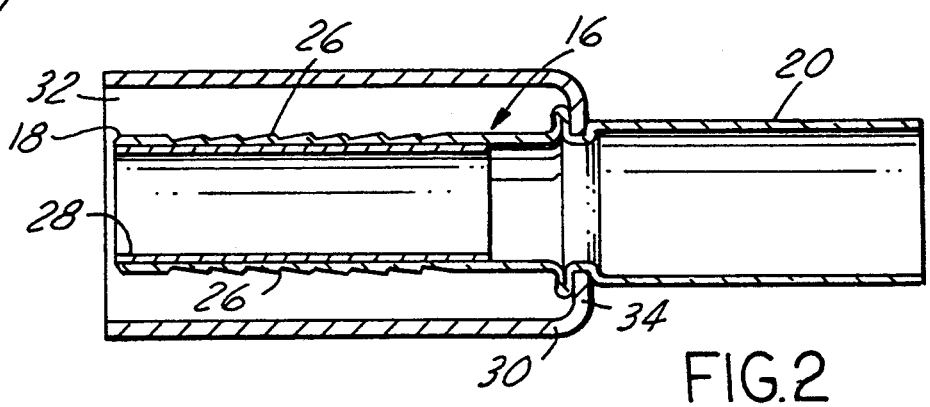
FIG. 2 is a cross-sectional view of the connector of FIG. 1 taken along lines 2—2 of FIG. 1.
Figure 3:
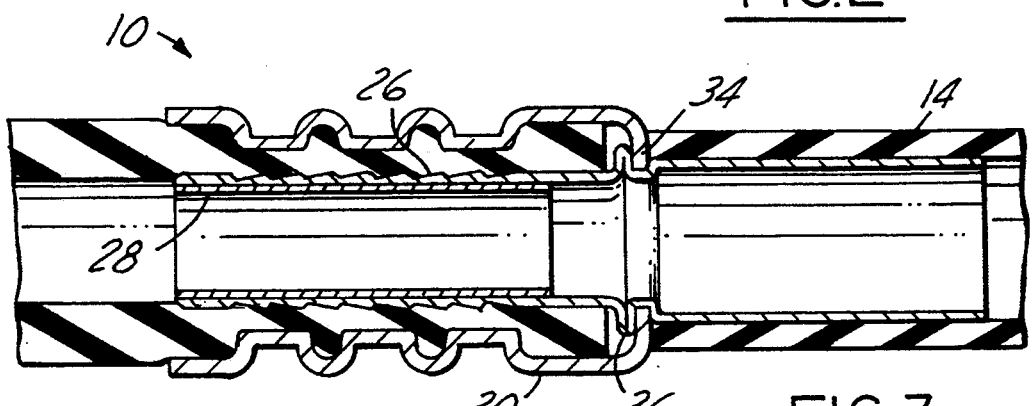
FIG. 3 is a cross-sectional view of a hose assembly according to the present invention.

Referring now to the drawings, FIGS. 1–3 show the tubular connector and hose assembly of the present invention. The connector, generally designated at 10, interconnects a first hose member 12 to a second hose member 14 or a connection end point of a source of fluid, such as an air conditioning condenser or evaporator. The connector is especially useful for connecting a pair of hose members carrying automotive air conditioning fluid therethrough. However, the connector 10 of the present invention may be utilized to carry any type of automotive fluid and is not necessarily limited to the air conditioning art.

The connector 10 of the present invention includes a unitary, generally elongated tubular body 16 having a first end 18, a second end 20 and a shoulder 22 interposed therebetween. The first end 18 matingly engages the first hose member 12 while the second end 20 of the body 16 receives the second hose member 14 therein. The first end 18 of body 16 includes a plurality of spaced, annular radially outwardly extending barbs 26 provided on the outer surface thereof. The barbs 26 engage the inner surface of the first hose member 12 to provide a positive resistance for preventing the withdrawal of the first hose 12 therefrom.

The first end 18 of the tubular body 16 further includes a generally tubular liner 28 having a diameter slightly greater than an interior diameter of the first end 18 of the body 16. The liner is press-fit into the first end 18 of the body 16 and provides structural rigidity and strength to the connector 10. Typically, the liner is formed from a different material than the body 16 to increase the structural rigidity of the body.

The connector 10 further includes a generally cylindrical, cup-shaped collar 30 surrounding the outer surface of the first end 18 of the body as well as the first hose member 12. The collar includes an open end 32 and a terminating end 34. The terminating end 34 abuts the shoulder 22 of the body 16 and a roll formed bead, or beadlock 36 is formed against the interior surface of the terminating end 34 of the collar 30 to prevent axial displacement of the collar 30 along the length of the body 16 of the connector 10. After the first hose member 12 is placed over the barbs 26 on the first end 18 of the body 16, the collar 30 is crimped in a known manner over the hose to prevent the withdrawal of the hose 12 from the connector as shown in FIG. 3. By providing the liner 28 of a different material than the tubular body 16, the crimping operation will not deform the first end of the body 16 and thus minimizes the risk of leakage therearound.

Figure 5:
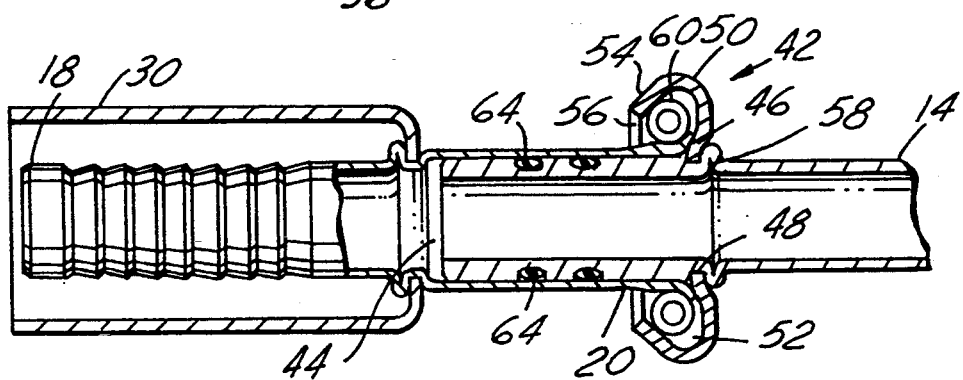
FIG. 5 is a cross-sectional view of a quick-connect coupling system mated to one end of the connector of the present invention.

The second end 20 of the body 16 is configured to engage a variety of different hose coupling arrangements. For example, the end can be radially outwardly flared. As such, the connector can be utilized with a coupling arrangement such as a quick-connect tubular coupling described in U.S. Pat. No. 4,055,359, assigned to the assignee of the present invention, and the disclosure which is hereby incorporated by reference. FIG. 5 shows a cross-sectional view of the quick-connect coupling of the '359 patent in operation with the connector 10 of the present invention. As shown in FIG. 5, the reference numeral 40 generally designates the quick-connect tubular coupling of the '359 patent. To utilize such a coupling with the connector of the present invention, the second hose member 14 includes a cup-shaped cage 42 externally mounted thereon, the cage 42 being positioned on the second hose member 14 in axially spaced relationship to the free end 44 of the second hose member. This provides a substantially elongated portion of the hose member between the cage 42 and the tube end 44.

The cage has a substantially radially extending base portion 46 having a circular aperture 48 through which the second hose member end portion 44 projects, a curved wall 50 forming an enlarged annular chamber 52 and an angularly inclined circular flange 54 extending toward the hose end portion 44 in the general direction of the free end thereof. The flange 54 terminates in radially spaced relation to the surface of the tube end portion to provide an access opening 56 in communication with the chamber 52.

The cage 42 is fixedly retained against axial movement along the hose member 14 by a retention means which preferably comprises roll-formed upset beads 58. The upset beads abut the outer and inner surfaces, respectively, of the cage base portion 46.

The coupling 40 further comprises the second end 20 of the body 16 having its end portion 24 telescopically slidable over the free end portion 44 of the second hose member 14. The free end of the second end 20 of body 16 is provided with an outwardly extending flare. The flared end in coupling-assembled condition projects through the access opening 56 in the cage 42 into the chamber 52.

A circular spring 60 is contained within the chamber 52 of the cage 42, the spring also being known as a garter spring. In assembled condition of the coupling, the spring 60 is interposed between the flare of the second tube end 20 of body 16 and the inner wall of the flange 54 of the cage 42 and thereby prevents separation of the hose members from the connector 10 in a direction to cause telescopic disengagement of the second hose member from the connector.

The inner end portion of the second hose member 14 has spaced circular grooves 62 formed in its tubular wall, and the grooves accommodating conventional "O" rings 64. The "O" rings 64 in assembled condition of the coupling are compressed in a sealed mode thus preventing leakage between the two end portions. The "O" rings seated in the grooves are highly visible prior to assembly of the second hose member to the second end 20 of the connector 10 so that an operator can determine their existence before connecting the hose member to the connector 10. Obviously, other types of hose couplings may be utilized with the connector 10 of the present invention.

Figure 4A:
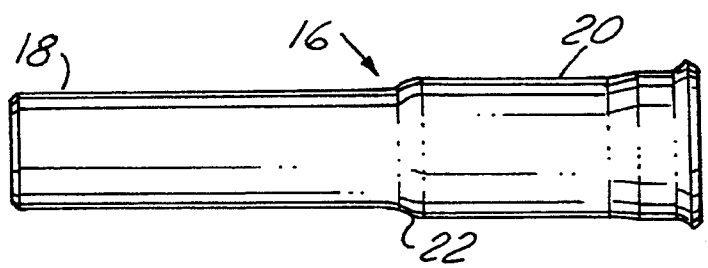
FIGS. 4A–E show the steps of a method for making a connector according to the present invention.
Figure 4B:
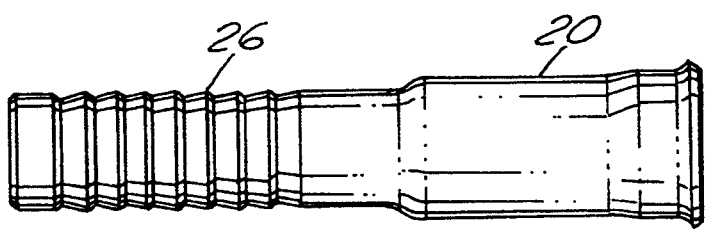
Figure 4C:
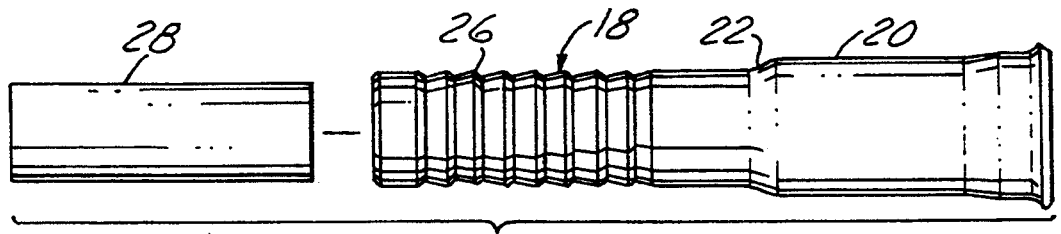
Figure 4D:
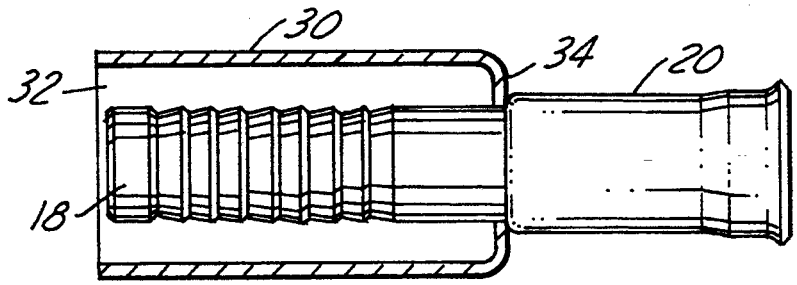
Figure 4E:
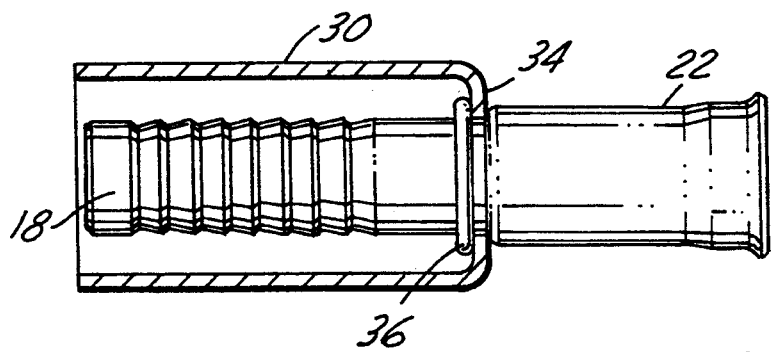

FIGS. 4A-E show the steps of fabricating the connector 10 of the present invention. As shown in FIG. 4A, the generally elongate, tubular body 16 can be formed from a tubular blank preferably made from an aluminum alloy. The tubular body 16 is formed, such as by stamping, having a first end 18, a second end 20 and a shoulder 22 interposed therebetween. As illustrated, the second end 20 can be radially outwardly flared depending upon the connection with which it is to mate. However, the present method contemplates a variety of configurations for end 20. FIG. 4B shows the second step in the method for making the connector wherein the plurality of outwardly projecting barbs are roll-formed on the outer surface of the first end 18 of the tubular body 16. After the barbs are formed, the liner 28 is press-fit into the internal diameter of the first end 18 of the tubular body 16 as shown in FIG. 4C. The liner is formed from a steel alloy to increase the structural rigidity of the first end 18 of the tubular body 16. FIG. 4D shows the next step in the manufacturing process wherein the generally cylindrical, cup-shaped collar 30 is placed over the first end of the body 16 such that the terminating end 34 of the collar 30 abuts the shoulder 22 between the first end 18 and second end 20 of the body 16. The open end 32 of the collar 30 surrounds the first end 18 of the body 16. The final step is shown in FIG. 4E wherein a roll formed bead, or beadlock 36 is formed against the interior surface of the terminating end 34 of the collar 30 to prevent the axial displacement of the collar 30 relative to the body 16. As explained above, the tubular body is formed from a lightweight aluminum alloy which decreases the weight of the assembly. The liner provides structural rigidity to prevent deformation to the body during the crimping operation and thereby minimizes the risk that the connector will leak.

Various other modifications and permutations of the present invention will become apparent to those skilled in the art. It is the following claims, including all equivalents, which define the scope of the invention.

What is claimed is:

1. A connector for joining together a pair of fluid carrying hose members in an automotive vehicle, comprising:
    a generally tubular body having a first end, a radially outward flared second end adapted to matingly engage a quick connect coupling formed on one of said fluid carrying hose members and a shoulder interposed therebetween, said first end including a plurality of angled barbs projecting from an outer surface thereof and being adapted to be inserted into one of said hose members;

a generally tubular liner having a predetermined length press-fit into said first end of said body and being fabricated from a material different from that of said body;

a generally cylindrical, cup-shaped collar surrounding the outer surface of said first end of said body, said collar having an open end and a terminating end, said terminating end abutting said shoulder of said body, said collar being adapted to be crimped over the other of said fluid carrying hose members such that a plurality of axially spaced crimp projections are formed therein to resist axial movement of said hose member; and means for resisting axial displacement of said collar on said body, said means comprising a roll formed bead formed against an interior surface of said collar terminating end.

2. A connector according to claim 1, wherein said body is fabricated from an aluminum alloy.

3. A hose assembly for joining together a first fluid carrying member and a heat exchanger in a motor vehicle, said assembly comprising:

a first hose member;

a connector interposed between said first hose member and a second hose member fluidly connected to said heat exchanger, said connector comprising:

a generally tubular body having a first end, a radially outward flared second end and a shoulder interposed therebetween, said first end including a plurality of angled barbs projecting from an outer surface thereof and being adapted to be inserted into said first hose member;

a generally tubular liner having a predetermined length press-fit into said first end of said body and being fabricated from a material different from that of said body;

a generally cylindrical, cup-shaped collar surrounding the outer surface of said first hose member when said first hose member is disposed over said first end of said body, said collar having an open end and a terminating end, said terminating end abutting said shoulder of said body, said collar being adapted to be crimped over said first hose member such that a plurality of axially spaced crimp projections are formed therein to resist axial movement of said first hose member; and a beadlock formed on an outer surface of said body against an interior surface of said collar terminating end and adapted to prevent axial displacement of said collar on said body;

said second hose member including a coupling adapted to matingly engage said second end of said connector, whereby said collar is adapted to be crimped over said first hose member to provide a leak free seal, said coupling comprising:

a cage means forming a chamber mounted against axial displacement on the outer surface of said second hose member near one end thereof and having an aperture facing said second hose member end;

radially expandable garter spring means located within the chamber of said cage means around the outer surface of said second hose member end, for expanding radially over the flared second end of said body of said connector to become located between the outer surface of said flared second end and the inner surface of said cage means thereby preventing axial withdrawal of the flared second end from the second hose member of the heat exchanger.

4. A hose assembly according to claim 3, wherein said connector is fabricated from an aluminum alloy.

5. A hose assembly according to claim 4, wherein said liner is fabricated from a steel alloy.

* * * * *